Sept. 19, 1939.　　　C. W. HANSELL　　　2,173,164
SIGNALING APPARATUS
Filed Aug. 14, 1937
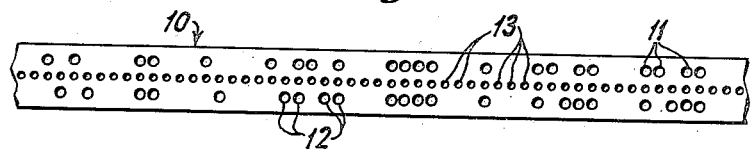
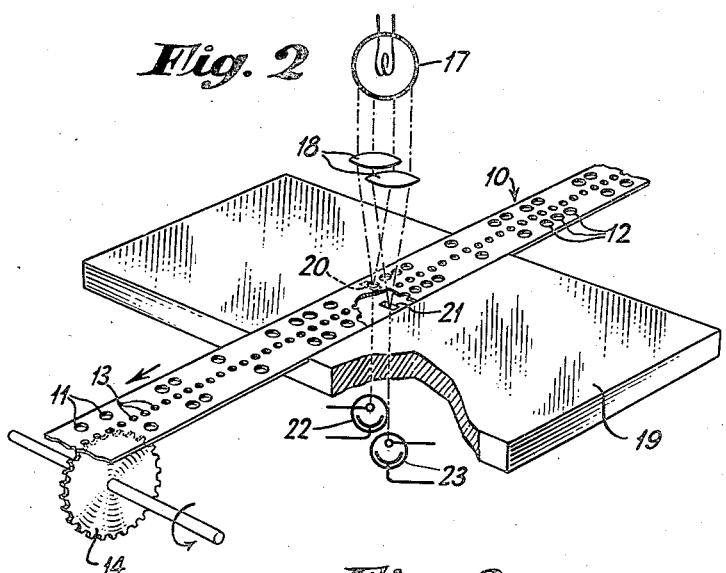
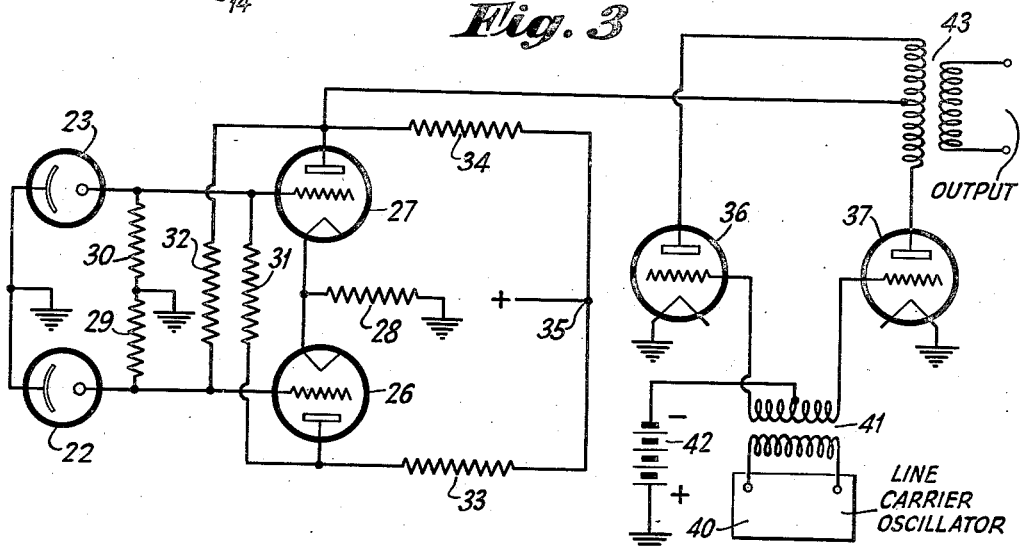
INVENTOR
C. W. HANSELL
BY
ATTORNEY Patented Sept. 19, 1939

2,173,164

UNITED STATES PATENT OFFICE 2,173,164

SIGNALING APPARATUS

Clarence W. Hansell, Port Jefferson, N. Y., assignor to Radio Corporation of America, a corporation of Delaware Application August 14, 1937, Serial No. 159,028

3 Claims. (Cl. 250—41.5)

This invention relates to signal transmitting apparatus and in particular to an improved method of and means for converting signal indications into electrical energy in the form of impulses representative of the signals converted.

More in detail this invention relates to means for converting signal indications on a tape into potential variations of signal characteristic duration automatically without the use of any mechanical relays or moving parts. The signal impulses may then be used in an improved manner to key or modulate an oscillation frequency generator which is in turn connected to a radiating system or the signals may be repeated and sent directly over a line to a distant point to be again converted into legible signals.

Automatic translating apparatus for converting markings on a tape into electrical energy has been known heretofore in the art. An example of such an apparatus is shown in the patent to Sholkin #1,962,467 assigned to Radio Corporation of America, and the present invention is an improvement on the invention shown and described in the patent.

One of the objects of the present invention is to provide a transmitter that may convert automatically without the use of any moving parts, as for example feelers or relays, signal markings of any known kind, either shading on the tape or markings comprising perforations in the tapes into signal impulses characteristic of the marking.

Another object of the present invention is to provide signal translating apparatus of the above nature by means of which signals may be converted into current impulses at a higher rate of speed than possible heretofore.

Another object of the above invention is to provide signal translating means which will, at a high speed and automatically, convert signal markings of any nature whatever on the tape into current impulses, the duration of which and the constancy of which may be predetermined by a novel means incorporated in the translating means.

A further object of the present invention is to provide means for insuring that the marking potentials will remain constant for a duration sufficient to clearly and accurately indicate the character of the signal converted. This feature is desirable for high speed work to properly distinguish between dots and dashes, or for any signal transmission wherein it is imperative that the impulses be sustained for a length of time closely representative of the length of the signal marking to be translated, and also where the potentials control directly the modulation or keying of the line carrier frequency oscillator.

Other purposes and advantages of the invention will become apparent to those skilled in the art and the construction of the invention and the mode of operation thereof will be better understood by the following description, particularly when read with the attached drawing throughout which like reference numerals indicate like parts and in which:

Figure 1 shows by way of example a tape having signal markings thereon;

Figure 2 shows the means whereby the markings may be converted into electrical variations, and Figure 3 shows by way of example a system for controlling the keying or modulating of a line carrier oscillator.

Referring to the drawing and in particular to Figure 1, the signals to be converted are indicated on a tape in any manner as, for instance, light and dark contrasts or by perforations therein obtained in any well known manner. For purposes of illustration, a tape punched on a standard perforator is shown in Figure 1. On this tape 10, the upper row of holes 11 are taken for purposes of illustration as being the marking holes and the lower holes 12 are taken for the same purposes as the spacing holes. The spacing holes are advanced with respect to the marking holes by a slight amount as is customary in such perforated tapes. The middle row of holes 13, as is well known, are used to pull the tape through the keying apparatus or in this case through the photoelectric automatic translator or converter. These holes 13 cooperate with a sprocket wheel 14 which is driven by any appropriate means at a proper speed in order to advance the tape through the photoelectric translator.

The photoelectric translator for converting the signal markings into electrical current or voltage variations is shown in Figure 2. This apparatus includes a source of light 17 which may, for instance, be an ordinary incandescent light, and a lens system 18 for concentrating the light from the source 17 into beams which are directed upon the rows of marking and spacing holes 11 and 12. The support member 19, over which the tape is drawn, is provided with a pair of openings 20 and 21 through which the light from the source may be projected in order to actuate the photoelectric cells 22 and 23. Whenever a perforation is present over either of the openings 20 or 21, the light from the source 17 is permitted to impinge upon the one or the other of the photoelectric cells 22 and 23.

In Figure 3 is shown a system for controlling the modulation or keying of the line carrier oscillator frequency from the voltage variations derived from the photoelectric cells 22 and 23. One electrode of each of the photoelectric cells is connected to ground while the other electrode of each of the photoelectric cells is connected to the control grid of the discharge tubes 26 and 27 as shown in the diagram. The anodes of each of these discharge tubes 26 and 27 are connected to a positive source of current and each connection includes an anode resistor 33 and 34 respectively. The cathodes or emitters of the discharge tubes are connected to ground by way of a resistance 28, the resistance being inserted in this connection in order that the electrodes of the tubes, particularly the control electrodes, may be maintained at proper operating potentials.

In the schematic diagram the two tubes have resistance feedback one to the other, so that only one tube at a time draws anode current. This resistance feedback is accomplished by cross-connecting the control electrodes and the anodes of the tubes 26 and 27 by way of resistances 31 and 32 as shown in the diagram. Connected in parallel with each of the photoelectric cells 22 and 23 are a pair of resistances 29 and 30 for the purpose of assisting in the individual and alternate operation of the discharge tubes 26 and 27. When one of the photoelectric cells is activated by light from the source 17, the corresponding resistance in shunt therewith is effectively shorted and the potential of the control grid of the corresponding discharge tube is altered.

In the operation of the system, when the control grid of the tube 26 is made positive through the action of the resistance 29 the tube becomes conducting and current flows through the tube. This current produces a certain voltage drop across the resistor 33 and the values of the resistance 31 and the anode resistance 33 are so chosen that a predetermined voltage drop across the resistance 33 caused by the current flow when cell 26 is conducting, causes the control electrode of tube 27 to become sufficiently negative with respect to its cathode to almost stop current from flowing through the tube 27. In view of the reduction in the anode current of tube 27, which heretofore has been conducting, the voltage drop across the resistor 34 is decreased. Because of the decrease in this voltage drop the potential of the anode of tube 27 is increased, and, because of the cross connection which includes the resistance 32, the control grid of tube 26 is made more positive and the discharge tube 26 is maintained conductive. This positive bias of the control electrode of tube 26 will maintain current through this tube of the same value even if the impulse received by the control grid of tube 27 was instantaneous as a result of a flash of light of the photoelectric cell 23.

When the tape is moved to such a position as will bring one of the spacing holes into alignment with the opening 20, light will then be permitted to strike the photoelectric cell 22. As a result of the impulse derived from the cell 22, the resistance 29 is in effect shorted, which reduces the positive potential of the control electrode of tube 26 causing little or no anode current to flow in this tube. Since less current then flows through the resistance 33, the potential of the control electrode of tube 27 will be made less negative or sufficiently positive to permit a conduction through the tube 27. Conduction in this tube will then, as explained before in connection with tube 26, cause a continued operation of the discharge tube 27 and a discontinuance of the operation of the tube 26 until a beam of light is projected upon cell 23.

It may be seen, therefore, that the discharge tubes 26 and 27 are made alternately conductive and non-conductive in accordance with the spacing and position of the perforations in the marking and spacing rows of holes.

In view of the intermittent operation of the discharge tubes, and because of the anode resistances connected in circuit therewith, the anode potentials of the discharge tubes will be varied in accordance with the conducting or non-conducting condition of the tubes. This variation in potential is used to key, or modulate, the line frequency oscillator as will now be explained.

The line frequency oscillator is shown schematically at 40 and the output of this oscillator is connected, by way of a transformer 41, to the control electrodes of a pair of discharge tubes 36 and 37 which are connected for push-pull operation. A source of current 42 is connected to the mid-point of the secondary of the transformer 41 in order that the control electrodes of these tubes may be maintained at appropriate potentials. The anodes of the tubes 36 and 37 are connected to the primary of an output transformer the secondary of which may be connected to a radiating system or to a transmission line as deemed desirable. The mid-point of the primary of transformer 43 is connected to the anode of one of the discharge tubes 26 or 27, and as shown in the diagram this connection is made to the anode of tube 27.

When tube 27 is non-conductive the potential of the anode of the tube is positive by a certain amount, this amount being sufficient to permit current to flow in the primary of the transformer 43 and accordingly to be present in the output circuit of the transformer. When the tube 27 is made conductive, the potential of the anode of this tube is decreased because of the presence of the resistance 34 as explained above, and this decrease in potential causes the current flow in the anodes of tubes 36 and 37 to be decreased or eliminated with a corresponding decrease or elimination in the current present in the secondary of the transformer 43.

It may be seen, therefore, that the amplitude of the carrier frequency in the secondary of transformer 43 is continuously and abruptly being changed from a maximum to a minimum in accordance with the alternate operation of the tubes 26 and 27 which operate in accordance with the light variations on the photoelectric cells 22 and 23 as a result of the particular spacing and location of the perforations in the marking and spacing rows of holes of the tape.

From the above it may, therefore, be seen that a line carrier frequency may be modulated or keyed in accordance with the markings on a signal tape without the intervention of any mechanical or moving parts. Because of this, very rapid transmission is made possible with the added advantage that this rapid transmission is accurate and may be readily received and transferred into other signal variations or characters at a receiving station.

It is to be understood that the apparatus as shown in Figure 2 may be replaced by any other similar apparatus so long as the apparatus performs the function of translating the markings on the tape into electrical current variations.

It is to be further understood that it is not necessary for the applicant's system to be used in connection with perforated tapes, since, obviously, the system could as well be used in connection with tapes wherein light and dark markings are provided and in such an instance light directed upon the photoelectric cells would be by way of reflection from the tape rather than by transmission therethrough.

Various modifications and alterations may be made in the invention without departing from the scope thereof, and it is to be understood that any and all such modifications shall be considered as within the purview of the invention except as limited by the hereinafter included claims.

I claim as my invention:

1. A device for translating light variations into potential or current variations comprising a pair of light sensitive cells, a pair of thermionic discharge tubes each comprising an electron emitter, a control electrode and an anode, means for connecting a terminal of each of said cells respectively to the control electrodes of said tubes, a resistance connected in parallel with each of said cells, means including a resistance for connecting the anode of each tube to the control electrode of the other tube, a source of current connected to the anodes of said tubes and a resistance in each of the connections and means whereby said tubes will be made alternately conducting and non-conducting in accordance with the light directed upon said cells.

2. A device for translating light variations into potential or current variations comprising a pair of light responsive cells, a pair of thermionic discharge tubes each comprising an electron emitter, a control electrode and an anode, means for connecting one terminal of each of the said cells respectively to the control electrodes, means for connecting the other terminal of each of the said cells to ground potential, a resistance connected in parallel with each of said cells, means for connecting the said emitters to ground potential and a resistance in said connection, resistance means for connecting the said anode of each tube to the control electrode of the other tube and means for connecting a source of positive potential to each of said anodes and a resistance in each connection.

3. A device for translating light variations into current or potential variations comprising a pair of light responsive devices, a pair of thermionic discharge paths, each including an electron emitter, a control electrode and an anode, means for connecting one terminal of each of said devices respectively to the control electrodes, means including a resistance for connecting the other terminal of each of said devices to said electron emitter, a resistance connected in parallel with each of said devices, means including a resistance for connecting the anode of each discharge path to the control electrode of the other discharge path, and means including load resistances for maintaining the anodes positive with respect to the said other terminal of each of said devices.

CLARENCE W. HANSELL.